(12) United States Patent
Glassell et al.

(10) Patent No.: US 6,223,776 B1
(45) Date of Patent: May 1, 2001

(54) GUIDABLE PIPE PLUG

(75) Inventors: Richard L. Glassell, Knoxville; Scott M. Babcock; Benjamin E. Lewis, both of Farragut, all of TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/318,961

(22) Filed: May 26, 1999

(51) Int. Cl.[7] ...................................................... F16L 55/10
(52) U.S. Cl. ................................ 138/89; 138/90; 138/89.3
(58) Field of Search ............................... 138/89, 99, 89.3, 138/90

(56) References Cited

U.S. PATENT DOCUMENTS

| | | | |
|---|---|---|---|
| 4,074,828 | * | 2/1978 | Haines et al. ........................ 138/89 |
| 4,425,943 | * | 1/1984 | Martin ................................... 138/89 |
| 4,751,947 | * | 6/1988 | Landers ................................ 138/89 |
| 5,379,803 | * | 1/1995 | Elgar et al. ........................... 138/89 |
| 5,469,890 | * | 11/1995 | Carpentier .......................... 138/89 |
| 5,558,130 | * | 9/1996 | McCabe et al. ..................... 138/89 |
| 5,878,784 | * | 3/1999 | Sales et al. .......................... 138/89 |
| 6,062,264 | * | 5/2000 | Dickson ............................... 138/89 |

OTHER PUBLICATIONS

Expansion Seal Technologies Group, Inc., "Bolt Type Medium Pressure Test Plugs," Mar. 18, 1999, p. 1.
Expansion Seal Technologies Group, Inc., "Grip Tight™ High Pressure Test Plugs," Mar. 18, 1999, p. 1.
Expansion Seal Technologies Group, Inc., "Large Diameter Multi–Size PipePlugs™," Mar. 18, 1999, p. 1.

* cited by examiner

Primary Examiner—James Hook
(74) Attorney, Agent, or Firm—Quarles & Brady LLP

(57) ABSTRACT

A plugging device for closing an opening defined by an end of a pipe with sealant comprises a cap, an extension, an inner seal, a guide, and at least one stop. The cap has an inner surface which defines a chamber adapted for retaining the sealant. The chamber is dimensioned slightly larger than the end so as to receive the end. The chamber and end define a gap therebetween. The extension has a distal end and is attached to the inner surface opposite the distal end. The inner seal is attached to the extension and sized larger than the opening. The guide is positioned forward of the inner seal and attached to the distal end. The guide is also dimensioned to be inserted into the opening. The stop is attached to the extender, and when the stop is disposed in the pipe, the stop is movable with respect to the conduit in one direction and also prevents misalignment of the cap with the pipe. A handle can also be included to allow the cap to be positioned robotically.

27 Claims, 5 Drawing Sheets

GUIDABLE PIPE PLUG

STATEMENT REGARDING FEDERALLY SPONSORED RESEARCH AND DEVELOPMENT

This invention was made with government support under contract DE-AC05-96OR22464, awarded by the United States Department of Energy to Lockheed Martin Energy Research Corporation, and the United States Government has certain rights in this invention.

CROSS-REFERENCE TO RELATED APPLICATION

Not Applicable

FIELD OF THE INVENTION

This invention relates to plugs for pipes. More specifically, the invention relates to a robotically guidable pipe plug for sealing a pipe.

BACKGROUND OF THE INVENTION

Pipes are often required to be capped or plugged when the need for the pipe is no longer required. The goal of the capping or plugging is to prevent the contents of the pipe from exiting the pipe and/or to prevent material outside the pipe from entering the pipe. Occasionally, the cap or plug is required to be permanent. As such, the cap or plug should provide a perfect seal. One situation, for example, which may require a permanent cap or plug is when liquid and/or solid hazardous waste is cleaned from storage tanks.

As the tanks are being cleaned, it is desirable to isolate those pipes that may discharge material back into the tanks. Otherwise a portion of a tank that was cleaned may need to be recleaned if additional material is introduced into the tank. Additionally, because hazardous waste that combines with nonhazardous waste typically makes the non-hazardous waste hazardous, preventing the introduction of non-hazardous waste into the tank decreases the total amount of hazardous waste to be cleaned. As such, preventing the introduction of other material into the storage tank is particularly important when cleaning hazardous material from a storage tank.

Although plugging a pipe is a relatively simple operation when the pipe is accessible and is in a clean environment, plugging a pipe in a restricted access environment containing hazardous waste is more complicated. Hazardous waste, and in particular radioactive hazardous waste, can prevent a human being from directly performing the operation. In such a situation, a substitute for a human, for example a robotic arm, is preferably used to perform the operation. However, such a substitute, like a robotic arm, currently lack the dexterity of a human hand. Additionally, the substitute would likely be guided by video camera instead of human sight, and a video camera provides poor depth perception for an operator. As such, equipment to plug a pipe for use by a human will be difficult for an operation in which a human cannot directly perform the operation.

Another problem associated with plugging pipes is that the pipes to be plugged can have different angular orientations. For example, the pipe could be horizontal, vertical, or in a position in between. Thus, depending upon the orientation, different forces act upon the cap and these forces can change how the pipe is plugged and the method of plugging the pipe. For example, with a vertically oriented pipe, unless the cap is fixed upon attachment, the cap must be prevented from falling off the pipe from the force of gravity. Thus an additional piece of equipment may be needed to hold the cap in place until the cap is permanently fixed to the pipe.

Still another problem associated with the plugging of a pipe is that the pipe may not be round and/or clean. For example, depending upon the material flowing through the pipe and the age of the pipe, material may have accumulated within the pipe. The pipe could also be partially corroded. As such, both the exterior and interior of the pipe may not be perfectly clean.

Many reasons also exist for why the pipe may not be perfectly round. For example, wear and tear on the pipe may cause the pipe to go out of round. One particular example is when the pipe is cut to be capped. In such a situation, the cutting of the pipe may cause the pipe to go out of round or create burrs on the pipe. Additionally, the aforementioned accumulations and corrosion may also cause the pipe to go out of round. As such, a pipe that is out of round or a pipe that is not clean may not be efficiently capped using current methods.

One current method of plugging a pipe is to fill the pipe with grout. Before filling, a second plug must be inserted into the pipe to block the flow of grout to all open sections of the pipe. A high pressure pump typically pumps the grout into the pipe. A pipe is then typically filled with approximately 20–30 feet of grout. Several problems are associated with the use of grout in a storage tank containing highly hazardous material in into which only a robot can enter. One such problem is that the grout cannot be easily placed within the pipe because of. limitations inherent with the use of a robotic arm. As previously stated, the robotic arm cannot be manipulated as dexterously as a human hand and this is exacerbated by use of the video camera to guide the movement of the robotic arm. Also, the hose system supplying the grout must be flushed immediately after use to prevent clogging the equipment. However, performing this operation inside the tank will increase the amount of hazardous waste to be cleaned. Additionally, tests have shown that grout does not provide a permanent seal over time when the grout is constantly subjected to water. Thus, not only is the introduction of the grout inside the pipe problematic, the grout will not necessarily provide a permanent seal.

Another tool that can be used to cap a pipe is to use a commercially available pipe plug. However, this tool requires that the pipe be perfectly round and clean before application. Otherwise, the tool will not necessarily plug the pipe. As such, this tool may not be appropriate for pipes that are out of round and/or not clean and cannot be placed into round and/or cleaned because of where the pipe is located. Additionally. this tool is only intended to be used temporarily, and thus would likely not provide a permanent seal.

This tool also requires that a nut be tightened as part of the installation process. Tightening of a nut is a process not easily accomplished by a robotic arm that is not specifically adapted for tightening of a nut. Also, even if the robotic arm is specifically adapted to tightening the nut, this adaptation would hamper the robotic arms ability to deliver the plug into the pipe. As such, two robotic arms would likely be necessary to apply this tool. Another problem associated with this tool is that it must be very precisely aligned within the pipe, and the required alignment is difficult to perform robotically.

Other methods of capping a pipe include welding a cap onto the pipe or applying a threaded cap onto a threaded pipe. Although relatively simple to perform when the pipe can be easily accessed, these methods are very difficult to perform robotically with a video camera. Additionally, if a threaded cap is to be used and the pipe does not have threads, for example after the pipe has been cut, creating the threads on the pipe robotically is also very difficult.

As such, the currently available tools are impracticable with use in a hazardous waste environment, particularly one in which a human being can not directly work. Also, the currently available tools do not permanently and adequately seal pipes that are not clean and are not perfectly round.

BRIEF SUMMARY OF THE INVENTION

It is therefore an object of the invention to provide a device for sealing one opening in a pipe that only requires one robotic arm for installation.

It is another object of the invention to provide a device for sealing one opening in a pipe that is effective regardless of the orientation of the pipe.

It is yet another object of the invention to provide a device for sealing one opening in a pipe that is not perfectly round or clean.

It is a further object of the invention to provide a device that can be used to seal one opening in a pipe in a hazardous waste environment.

It is still another object of the invention is to provide advices that will permanently seal one opening in a pipe upon use.

These and other objects of the invention are achieved by the subject device which comprises a cap, an extension, an inner seal, a guide, and at least one stop. The cap has an inner surface which defines a chamber adapted for retaining sealant. The chamber is dimensioned slightly larger than the end of the pipe to be sealed so as to receive the end. The chamber and end define a gap therebetween. The extension has a distal end and is attached to the inner surface opposite the distal end. The inner seal is attached to the extension and sized larger than the opening. The guide is positioned forward of the inner seal and attached to the distal end. The guide is also dimensioned to be inserted into the opening. The stop is attached to the extender, and when the stop is disposed in the pipe, the stop is movable with respect to the conduit in one direction and also prevents misalignment of the cap with the pipe. A handle can also be included to allow the cap to be positioned robotically.

In a second embodiment of the invention, the extender and cap define a cap conduit extending from the cap and through the extender. The cap conduit can communicate material from inside the pipe to outside the pipe. The end of the cap conduit adjacent to the cap can also include a valve. This particular is particularly useful in placing a valve upon an end of a pipe that would not otherwise accept a valve.

BRIEF DESCRIPTION OF THE DRAWINGS

There are shown in the drawings embodiments of the invention that are presently preferred, it being understood, however, that the invention is not limited to the precise arrangements and instrumentalities shown, wherein.

DETAILED DESCRIPTION OF THE INVENTION

Figure 1:
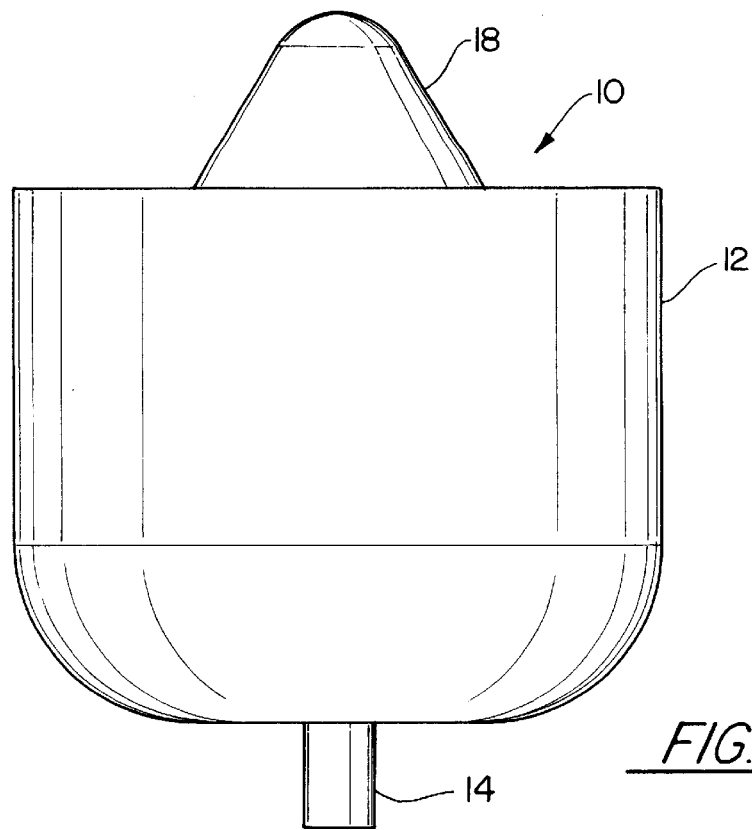
FIG. 1 is a side elevation of a pipe plug including a handle.
Figure 2:
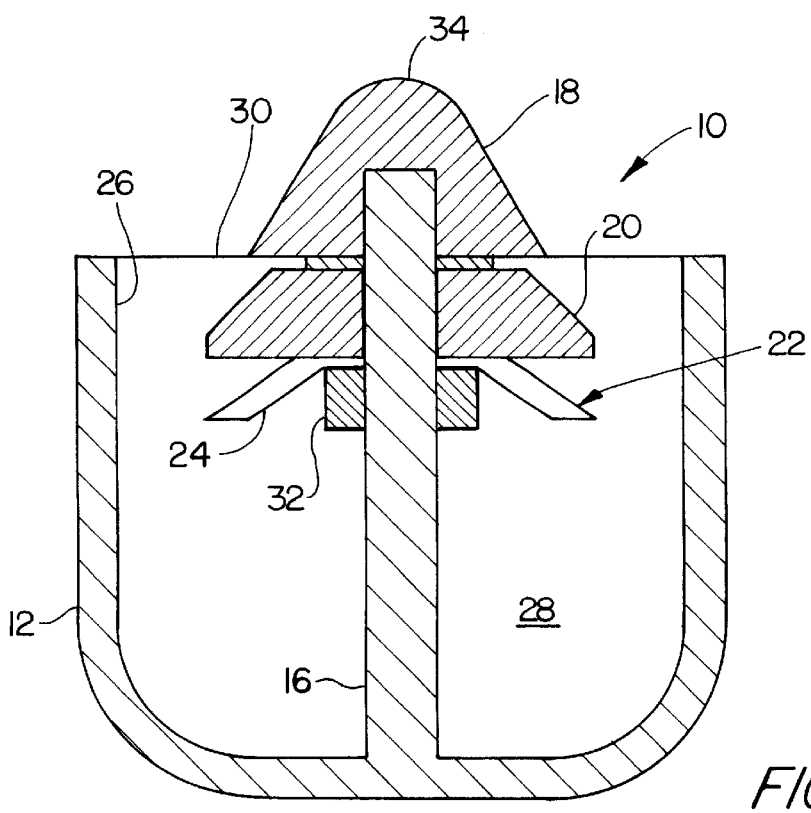
FIG. 2 is a cross-section of a pipe plug viewed from the side.

Referring to FIGS. 1 and 2, a device for plugging an opening in the end of a pipe, according to the present invention, is illustrated. The pipe plug 10 comprises a cap 12, a handle 14, an extender 16, a seal 20, and a stop 22. In use, the cap 12 is dimensioned to fit over the outside diameter of an end of a pipe (shown in FIGS. 9 and 10). Sealant (shown in FIGS. 9 and 10) inside the cap 12 is prevented from entering into the pipe by the seal 20. Instead, the sealant enters a gap between the outside diameter of the pipe and the inside wall 26. Once the sealant has set, the sealant and cap 12 act as a barrier to prevent any material inside the pipe from exiting the pipe or any material outside the pipe from entering the pipe. A more detailed discussion of the plugging of the pipe by the pipe plug 10 will follow later in the specification.

The cap 12 preferably serves two main functions. First, the cap 12 defines a cavity 28 for holding the sealant, and second, the cap 12 substantially surrounds the end of the pipe to prevent any material from entering or exiting the pipe. The inside diameter of the cap 12 should be slightly larger than the outside diameter of the pipe to be plugged. The difference in diameters provides a gap between the cap 12 and pipe into which the sealant can flow upon plugging of the pipe. Also, a larger cap diameter allows the cap 12 to be positioned over the end of the pipe without any interference. Interference is caused, for example, by the end of the pipe being out of round, the end of the pipe having being covered with foreign material, or the end of the pipe having burrs, for example caused by the pipe being cut at that location. For all of these reasons, and others, the inside diameter of the cap 12 is preferably larger than the outside diameter of the pipe.

However, providing a too large of difference between the two diameters can be detrimental to the ability of the pipe plug 10 to plug the pipe. As the difference in diameters increases, the potential also increases that the sealant will not fill the gap between the pipe and the cap 12. In such a situation, the cap 12 and sealant may not provide a proper barrier, and thus, the pipe will not be completely plugged. Thus, the difference in diameters should be determined by balancing the ability of the cap 12 to easily fit over the end of the pipe and preventing too large of a gap between the pipe and cap 12 so as to conserve sealant.

The chamber 28 should have a depth so as to be capable of completely receiving the end of the pipe. Additionally, a longer length of the pipe is preferably inserted into the chamber 28. Having the cavity 28 dimensioned to allow for insertion of a longer length of pipe allows for a longer gap between the inside surface 26 of the cap 12 and outside surface of the pipe and the cap 12 to cover a greater portion of the outside surface of the pipe. A longer gap allows the sealant to fill a greater space, and thus, a greater amount of sealant acts as a barrier between material inside the pipe and material outside the pipe. Also, by covering a greater portion of the outside surface of the pipe, the cap 12 may cover other openings formed in the pipe. These other openings may have been formed in the pipe for example, by corrosion or by physical damage to the pipe.

The cap 12 should be constructed from a material that is resistive to a corrosive environment and provide structural strength for the pipe plug 10. Material outside the cap 12 and/or inside the pipe may be corrosive. Thus, to prevent this material from exiting and/or entering the pipe, the cap 12 should be capable of resisting a corrosive attack. Many materials are capable of such resistance and all are acceptable for this purpose. However, the presently preferred material for construction of the cap 12 is stainless steel. Stainless steel provides both good corrosion resistance and structural strength.

The extender 16 functions to at least support the seal 20 away from the bottom of the chamber 28. The extender can also function to support the guide 18, stops 22, and the handle 14.

The extender 16 is preferably positioned so as to not interfere with the insertion of the pipe into the chamber 28. As such, the extender preferably extends outward from a substantially central position at the bottom of the chamber 28 towards the opening 30 of the chamber 28.

The extender 16 is attached to the cap 12 in a manner so as to prevent any material from entering or exiting the pipe because of the means of attachment. An exception is an alternative embodiment of the invention which is discussed with regard to FIG. 8. Many types of attachment are acceptable for the purpose of preventing any material from entering or exiting the pipe because of the means of attachment, and this invention is not limited as limited as to any of them. For example, the extender 16 and cap 12 can be formed integrally, such as in a casting. Alternatively, the extender 16 could be welded to the cap 12. Still another illustrative example is the extender 16 being threaded into the cap 12.

So long as the extender 16 is contained with the cap 12 and pipe, the extender 16 does not need to be constructed from a corrosion resistant material. However, in the situation where the extender 16 is attached to the cap 12 so as to pass completely through the cap 12, the extender 16 should be constructed from a corrosion resistant material similar to that used for the cap 12. The extender 16 is not otherwise limited as to the material from which the extender 16 can be constructed.

The seal 20 acts to prevent the sealant inside the chamber 28 from entering into the pipe. Many types of seals 20 are so capable and the invention is not limited as to any of them. In a presently preferred embodiment of the invention, the seal 20 is sized to be slightly larger than the inside dimensions of the pipe. The seal 20 is also preferably flexible at least around its periphery. Thus, insertion of the seal 20 into the inside of the pipe will deform the flexible periphery to conform with the inside dimensions of the pipe. The pressing of the periphery against the inside of the pipe will form a barrier that acts to prevent the sealant from entering the pipe.

The seal 20 is not limited as to the type of material from which it is constructed. Depending on the type of seal 20 used, different materials may be required. However, in the preferred embodiment, the outside periphery of the seal 20 is constructed from a flexible material which deforms to match the inside dimensions of the pipe and still provide a barrier that acts to prevent the sealant from entering the pipe. As the seal 20 will be contained within the cap 12, the material of the seal 20 need only remain intact until the sealant has set. The seal 20 may be directly connected to the extender 16. Alternatively, the seal 20 can be directly connected to either the guide 18 or the stop 22. In either situation, any type of attachment is possible. For example, the seal 20 could be welded to the extender 16, guide 18, or stop 22, or the seal 20 could be formed integrally with the extender 16, guide 18, or stop 22. Alternatively, the seal 20 can be selectively removable. One example of which is the seal 20 having an opening through which the extender 16 can be positioned. The seal 20 could be prevented from movement in one direction by a stopper, for example a nut or a shoulder on the extender 16. In a second direction, the seal 20 could be prevented from movement by a removable stopper, for example a nut.

In a preferred embodiment, the seal 20 is selectively removable from the extender 16. The seal is prevented from movement in one direction by a nut 32. The seal 20 is prevented from movement in a second direction by the guide 18. The seal 20 is preferably selectively removable to allow seals 20 with different sizes to be placed onto a single cap 12. This allows one size cap 12 to be used with pipes having the same outside dimensions but differing inside dimensions.

So long as the position of the seal 20 does not restrict the amount of sealant that can initially be placed within the chamber 28, the seal 20 can be located anywhere within the chamber 28. Preferably, the seal 20 is located adjacent the opening 30 to maximize the amount of sealant that can be introduced into the chamber 28.

At a minimum, the pipe plug 10 consists of the cap 12, the extender 16, and the seal 20. Upon installation, this combination will prevent material from exiting or entering the pipe via the opening in the end of the pipe. However, this combination is likely to be more difficult to install robotically than by human hand. For this reason, the presently preferred embodiment also includes a guide 18 for guiding the pipe plug 10 onto the pipe and/or includes a stop 22 for preventing removal of the pipe plug 10 and to help center the pipe plug 10 on the pipe. The most preferred embodiment includes both the guide 19 and stop 18. Additionally, if the pipe plug 10 is to be positioned onto the pipe using robotics, a handle 14 which can be robotically gripped is also included as part of the most preferred embodiment.

The handle 14 functions to enable the pipe plug 10 to be more easily gripped. Many types of handles 14 can be used with this invention and the type preferably used depends upon the manner in which the pipe plug 10 is to be gripped. In the presently preferred embodiment, the pipe plug 10 will be handled robotically, and thus requires a handle 14 that can be gripped robotically. As many types of robotic grippers are known in the art of robotics, the type of handle 14 will depend upon the particular type of robotic gripper used for this application. In a presently preferred embodiment, as shown in FIG. 1, the extender 16 extends through the cap 12 and also acts as the handle 14.

The guide 18 functions to guide the pipe plug 10 onto the pipe by first entering into the opening in the end of the pipe and then guiding the walls of the pipe towards the opening 30 of the chamber 28. Many different shapes, for example spherical or pyramidal, have been used to guide an object into an opening, and all are acceptable as a shape for the guide 18. However, the preferred shape for the guide is a conical shape that tapers to a spherical tip 34. Cones otherwise taper to a point. However, a pointed tip is more likely to cause damage to an object than a spherical tip 34 if the tip is accidentally forced against the object.

By tapering outward from the tip 34, the conical shape of the guide 18 acts to center the walls of the pipe within the opening 30 as the pipe is positioned closer to the opening 30. Also, the seal 20 preferably continues the outward taper of the guide 18 so as to further center the pipe within the opening 30.

The maximum outside transverse dimension of the guide 18 cannot be any larger than the inside dimensions of the pipe. Otherwise the guide 18 will not completely enter the pipe. Preferably, the maximum outside transverse dimension of the guide 18 is smaller by 75–80% than the inside dimension of the pipe to allow for possible irregularity in the inside dimension of the pipe.

The guide 18 is located so as to extend beyond the opening 30 of the chamber 28. By locating the guide 18 beyond the opening 30, the guide 18 can begin positioning the pipe towards the opening 30 before the pipe reaches the opening 30.

The guide 18 may be directly connected to the extender 16. Alternatively, the guide 18 can be directly connected to either the seal 20 or the stop 22. In either situation, any type of attachment is possible. For example, the guide 18 could be welded to the extender 16, seal 20, or stop 22, or the guide 18 could be formed integrally with the extender 16, seal 20, or stop 22. Alternatively, the guide 18 can be selectively removable. In a presently preferred embodiment the extender 16 is threaded into the guide 18. Thus, the guide 18 can be removed from the extender 16 by unthreading the guide 18.

The stop 22 can serve many functions. One function of the stop 22 is to prevent the pipe plug 10 from being removed from the pipe after the pipe plug 10 is positioned onto the pipe. This is particularly important during the time when the sealant has not set and movement of the pipe plug 10 is still possible with any movement possibly disrupting the barrier being formed by the pipe plug 10. Another function of the stop 22 is to align the pipe plug 10 with the pipe. Misalignment of the pipe plug 10 and pipe could lead to an incomplete barrier between the outside and the inside of the pipe.

The need for the stop 22 to prevent the pipe plug 10 from being removed from the pipe is typically most pronounced when the pipe is oriented vertically with respect to gravity. In such a situation, the weight of the pipe plug 10 will tend to pull the pipe plug 10 away from the pipe. With horizontally oriented pipes, a greater possibility of misalignment between the pipe and pipe plug 10 can occur because the weight of the pipe plug 10 is not typically balanced over the support points between the pipe and pipe plug 10. This imbalance of weight causes a torque to be exerted on the pipe plug 10 with this torque possibly causing misalignment.

Figure 3:
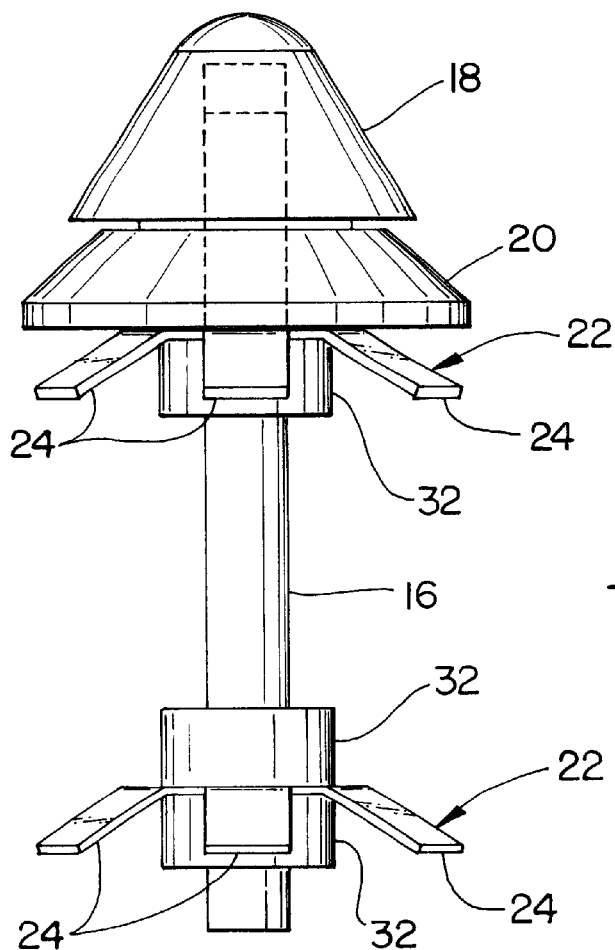
FIG. 3 is a side elevation of an assembly of an extender, guide, seal, and two stops.
Figure 4:
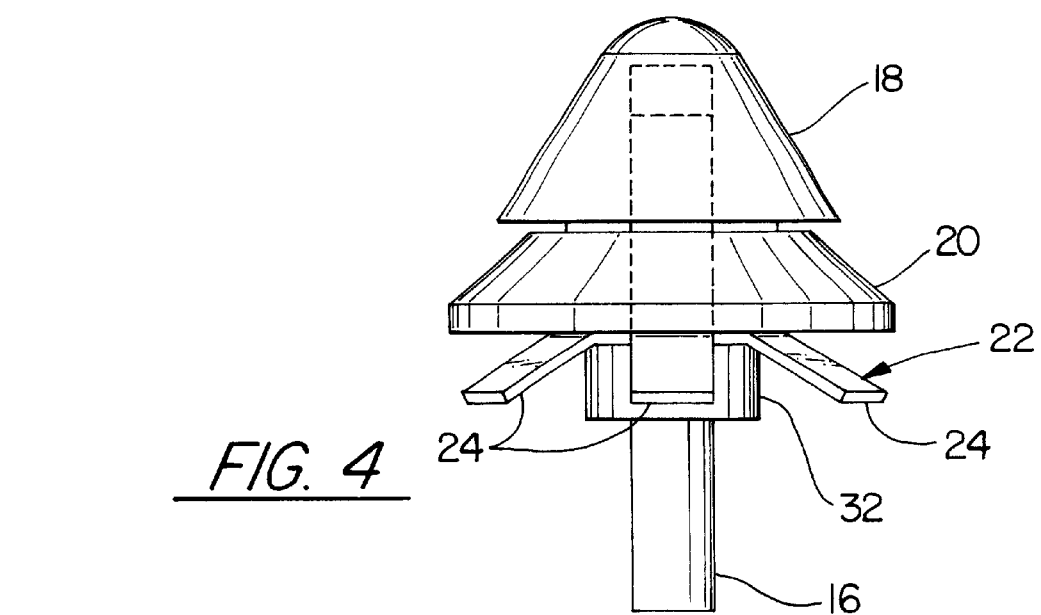
FIG. 4 is a side elevation of an extender, guide, seal, and one stop.

As illustrated in FIGS. 3 and 4. One or more stops 22 can be used. Multiple stops 22 are preferably used when the extender 16 reaches a length in which the weight of the pipe plug 10 is not balanced in a horizontally oriented pipe. The use of two or more stops 22 prevents either end of the extender 16 from being displaced towards the inner walls of the pipe, and therefore prevents misalignment of the pipe plug 10 with the pipe. Also, multiple stops 22 can be used to provide additional gripping power to prevent the pipe plug 10 from being removed from the pipe.

If one stop 22 is to be used, the stop 22 is preferably located adjacent the seal 20. As the stop 22 acts to prevent the extender 16 from being displaced towards the inner walls of the pipe, placing the stop 22 adjacent the seal 20 prevents the seal 20 from being positioned too close to the inner walls of the Otherwise, if the seal 20 is positioned too close to one wall, the seal 20 may not provide as an effective barrier for the other side of the wall.

Figure 5A:
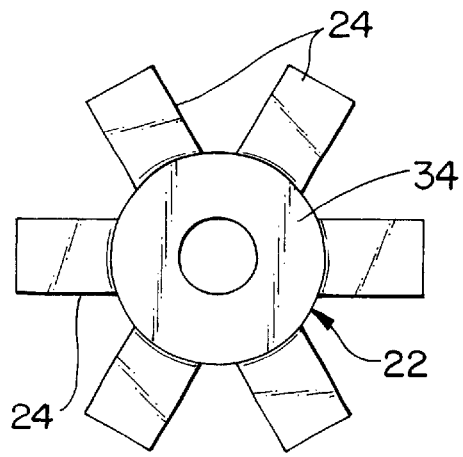
FIG. 5A is a plan view of a stop having six arms.
Figure 5B:
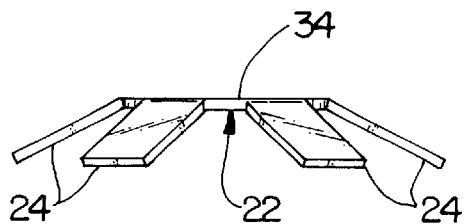
FIG. 5B is a side elevation of the stop in FIG. 5A.
Figure 6A:
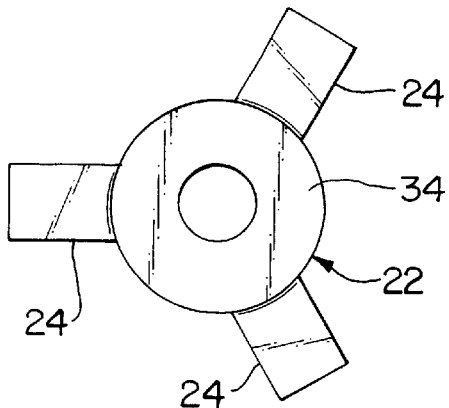
FIG. 6A is a plan view of a stop having three arms.
Figure 6B:
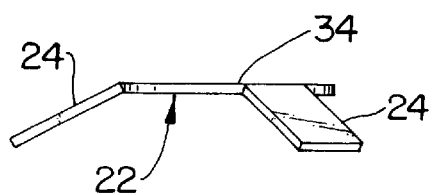
FIG. 6B is a side elevation of the stop in FIG. 6A.

As illustrated in FIGS. 5(A & B), 6(A & B), and 7(A & B), the stop 22 can have several different preferable shapes. However, each stop 22 preferably has at least two arms 24 are angled away from the direction in which the pipe plug 10 is to be inserted into the pipe. In a preferred embodiment, the arms are angled approximately 30 degrees from a transverse plane of the pipe. Each stop 22 is dimensioned so as to be slightly larger than the inside dimensions of the opening at the end of the pipe.

Upon insertion into opening of the pipe, these arms 24 act as flexible barbs. As such, movement of the pipe plug 10 into the pipe flexes the arms 24 inward to decrease the dimension of the stop 22. This decrease in dimension lessens the amount of friction between the arms 24 and pipe and enables the stop 22 to be inserted into the opening of the pipe. However, movement of the pipe plug 20 out of the pipe flexes the arms 24 outward to increase the dimension of the stop 22. This increase in dimension increases the amount of friction between the arms 24 and the pipe and prevents the stop 22 from being removed from the pipe.

The arms 24 of the stop 22 may be directly connected to the extender 16. Alternatively, the arms 24 can be directly connected to either the seal 20 or the guide 18. In either situation, any type of attachment is possible. For example, the arms 24 of the stop 22 could be welded to the extender 16, seal 20, or guide 18 or the arms 24 could be formed integrally with the extender 16, seal 20, or guide 18. Alternatively, the stop 22 can be selectively removable.

In a presently preferred embodiment the arms 24 are connected to a center portion 34 of the stop 22 through which the extender 16 can pass. The stop 22 is held in position by stoppers on either side of the stop 22. For example, these stoppers can be removable nuts 32 or the guide 18. In a preferred embodiment, to remove the stop 22 from the extender 16, a stopper on at least one side of the stop 22 must first be removed. The stop 22 can then be removed from the extender 16. The stop 22 is preferably selectively removable to allow stops 22 with different sizes to be placed onto a single cap 12. This allows one size pipe cap 12 to be used with pipes having the same outside dimensions but differing inside dimensions.

Although the stop 22 comprises at least two arms 24, more arms 24 are presently preferable. The arms 24 are preferably positioned symmetrically with respect to one another. Otherwise, a stop 22 with unsymmetrically oriented arms 24 could cause the pipe plug 10 to be misaligned with the pipe. Arms 24 are preferable as an alternative to a single circumferential section because the arms 24 can be easily bent in both directions so as to allow entry in one direction and to prevent withdrawal in the other direction. A single circumferential section is less likely to be bent in either direction.

Figure 7A:
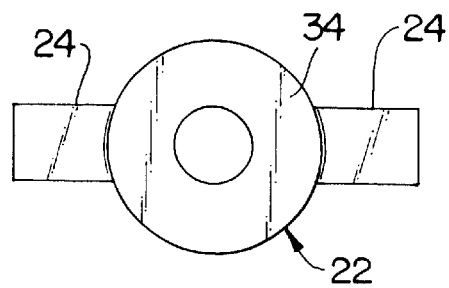
FIG. 7A is a plan view of a stop having two arms.
Figure 7B:
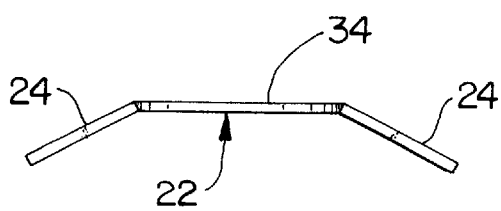
FIG. 7B is a side elevation of the stop in FIG. 7A.

A two-armed stop 22 is illustrated in FIGS. 7(A & B). A stop 22 with two arms is best utilized when the pipe plug 10 is to be inserted into a vertically oriented pipe. In such a situation, the primary function of the stop 22 is to prevent the pipe plug 10 from being removed from the pipe. Although the two-armed stop 22 can be used in a horizontally oriented pipe to keep the pipe plug 10 from being misaligned with the pipe, misalignment is less likely with a stop 22 having more than two arms 24. The presently preferred amount of arms 24 is six. This embodiment is illustrated in FIGS. 5(A & B). The six arms 24 of this stop 22 enable the stop 22 to effectively prevent the pipe plug 10 from being removed from the pipe and prevent misalignment of the pipe plug 10 and pipe.

The stop 22 should be constructed from material that is stiff enough to support the weight of the pipe plug so as to prevent misalignment of the pipe plug 10 yet be flexible enough to decrease in size during entry. As the stop 22 will be completely enclosed by the pipe and pipe plug, the stop 22 is not required to be corrosion resistant. However, the stop should be constructed from a material that will not degrade before the sealant has set. The presently preferred stop 22 is constructed from thin spring steel. This material provides a combination of strength and flexibility presently preferred for this invention. It is noted that spring steel is only one example of many types of material that are acceptable for use with this invention.

Figure 8:
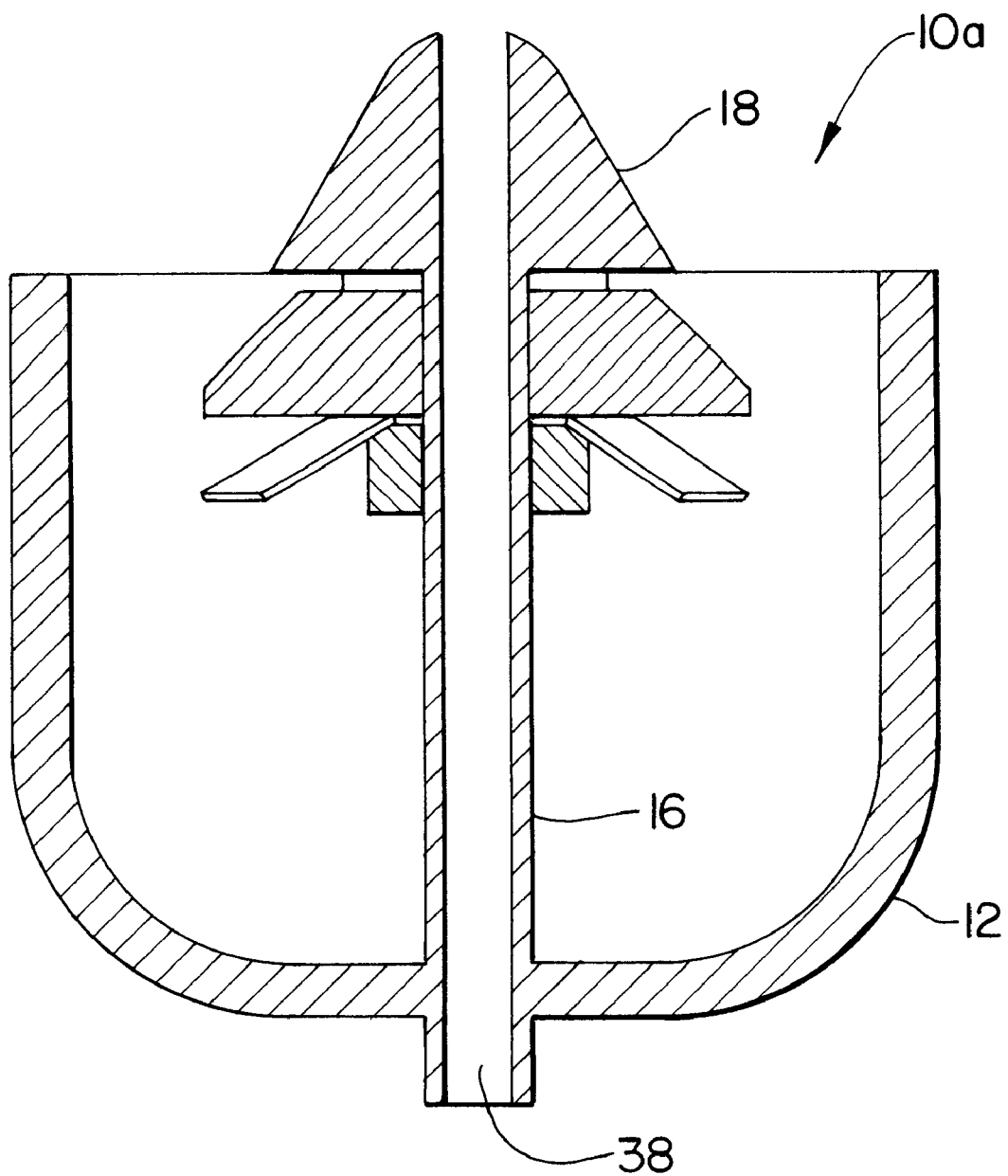
FIG. 8 is a cross-section of a second embodiment of a pipe plug having a cap conduit viewed from the side.

An alternative embodiment of the invention is illustrated in FIG. 8. The pipe plug 10a is similar to the previously mentioned pipe plug 10, with the addition of one feature. This feature is a cap conduit 38 through the extender 16 and cap 12. This cap conduit 38 allows material outside the pipe to enter the pipe and material inside the pipe to exit the pipe. This particular feature is useful for placing a valve (not shown) on the end of the pipe without the need to form threads on the pipe, which for example, are typically required to place a valve on the end of a pipe. For example, the valve could be positioned at the end of the channel 38 adjacent the cap 12.

Figure 10:
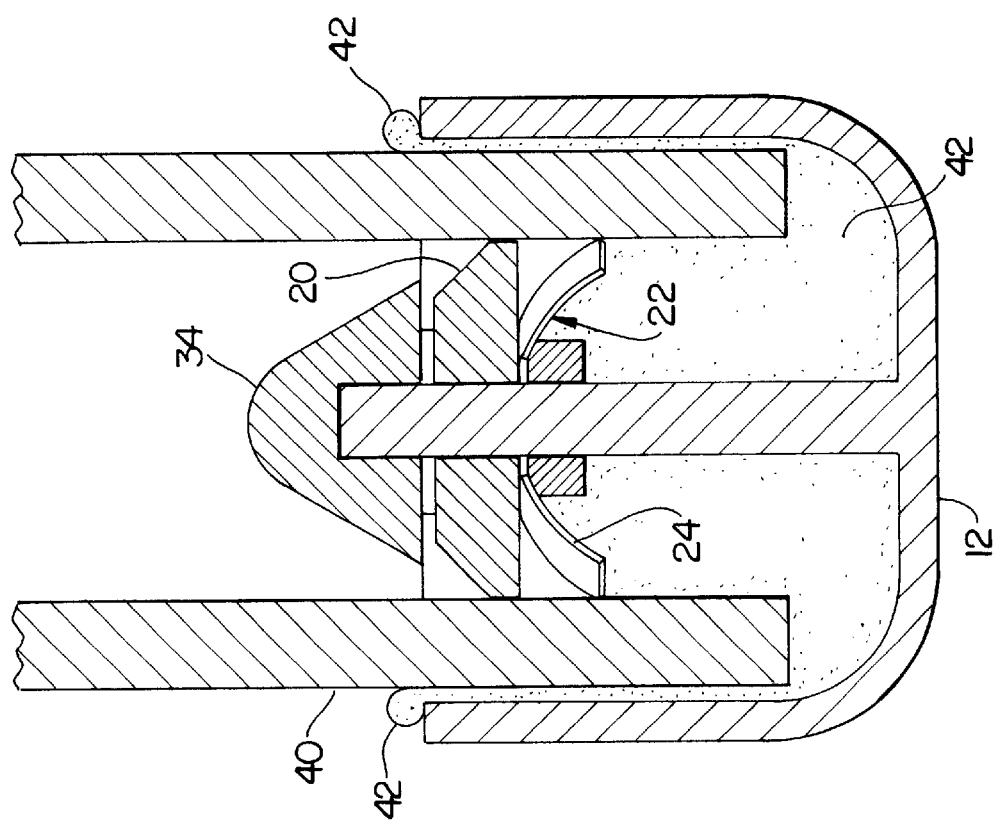
FIG. 10 is a cross-section of the pipe plug in FIG. 2 with a pipe fully inserted into the pipe plug.
Figure 9:
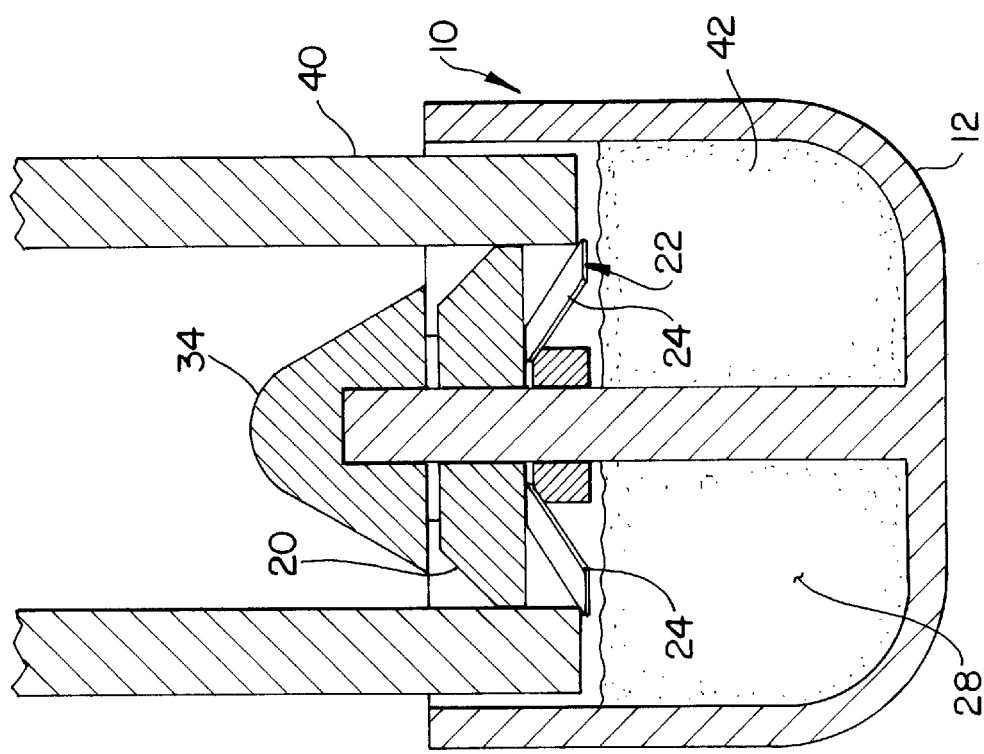
FIG. 9 is a cross-section of the pipe plug in FIG. 2 with a pipe partially inserted into the pipe plug.

FIGS. 9 and 10 illustrate the plugging of a pipe 40 with the pipe plug 10. Specifically, FIG. 9 illustrates the pipe 40 positioned within the chamber 28 and slightly above the sealant 42. FIG. 10 illustrates the pipe 40 completely inserted within the chamber 28 and sealant 42. As illustrated in FIG. 10, with the presently preferred stop 22, the arms 24 are bent by the passage of the pipe 40 into the chamber 28. The resiliency of the arms 24 presses against the pipe 40 and prevents the pipe 40 from being withdrawn from the chamber 28. Also, when the pipe 40 is inserted into the chamber 28, the pipe 40 displaces a volume of the sealant 42. Because the seal 20 prevents the sealant 42 from passing past the seal 20, the sealant flows into the gap between the inner wall of the cap 12 and the outer wall of the pipe 40. This gap provides a hermetic seal between the cap 12 and pipe 40.

Any sealant 42 capable of providing a hermetic seal between the cap 12 and pipe 40 can be used with this invention. However, in applications in which the cap 12 may be tilted during the application of the cap 12 onto the pipe 40, the sealant 42 preferably has a sufficiently low viscosity to prevent the sealant 42 from flowing out of the cap 12.

This feature is particularly important when the pipe plug 10 is to be maneuvered robotically inside a storage tank. In such a situation, a cap 12 containing the sealant 42 may be tilted or positioned upside down for a period of time. Also, because robotically maneuvering the cap 12 through the storage tank onto the pipe 40 takes time, the sealant 42 preferably has a long working time, most preferably approximately four hours. Otherwise, if the working time is shorter, the sealant 42 may have already begun to harden and thus be incapable of bonding the cap 12 to the pipe 40 by the time the pipe plug 10 is maneuvered into position In a situation in which the pipe plug 10 is to be used in a highly radioactive environment, the sealant 42 should also be resistant to radiation. Also, because the sealant 42 is preferably placed in the cap 12 outside of the radioactive environment to reduce radiation exposure to the person preparing the pipe plug 10, the sealant 42 preferably has a working time that allows for the cap 12 to be positioned onto the pipe 40 before setting.

Although any sealant 42 that includes the preferred characteristics is acceptable for use with this invention, the presently preferred sealant 42 is a two part (hardener and resin) epoxy adhesive produced by Devcon, an Illinois Tool Works Company located in Danvers, Maryland. This particular epoxy is resistant to radiation at doses up to approximately $5 \times 10^8$ Rad. With a contact radiation source producing 100 Rad/hour, the epoxy would have an expected life of approximately 570 years. This epoxy also includes a preferred characteristic of not being a hazardous material upon mixing.

It should be understood that the examples and embodiments described herein are for illustrative purposes only and that various modifications or changes in light thereof will be suggested to persons skilled in the art and are to be included within the spirit and purview of this application.

The invention can take other specific forms without departing from the spirit or essential attributes thereof for an indication of the scope of the invention.

What is claimed is:

1. A plugging device for closing with sealant an opening defined by an end of a pipe, comprising:
   a cap having an inner surface defining a chamber adapted for retaining the sealant, said chamber dimensioned slightly larger than said end to receive the end and define a gap therebetween;
   an extension having a distal end, said extension attached to said inner surface opposite said distal end; and,
   an inner seal attached to said extension and sized larger than the opening, whereby insertion of said end into said chamber displaces the sealant towards said inner seal and said gap, said inner seal providing a barrier for the sealant.

2. A device according to claim 1, further comprising a guide positioned forward of said inner seal and attached to said distal end, said guide dimensioned to be inserted into the opening.

3. A device according to claim 1, further comprising at least one stop attached to said extender, when said stop disposed in the pipe, said stop movable with respect to the pipe only an entry direction.

4. A device according to claim 3, wherein said at least one stop prevents misalignment of said cap with said pipe.

5. A device according to claim 4, wherein a first of said at least one stop is positioned adjacent said distal end.

6. A device according to claim 5, wherein a second of said at least one stop is positioned adjacent a bottom of said chamber.

7. A device according to claim 1, wherein said stop comprises at least two arms symmetrically disposed about said extender and angled away from said entry direction.

8. A device according to claim 1, further comprising a handle positioned on said cap.

9. A device according to claim 8, wherein said handle is adapted to be gripped robotically.

10. A device according to claim 8, wherein said extender passing through said cap provides said handle.

11. A plugging device for closing an opening defined by an end of a pipe with sealant, comprising:
    a cap having an inner surface defining a chamber adapted for retaining the sealant, said chamber dimensioned slightly larger than said end to receive the end and to define a gap therebetween;

an extension having a distal end, said extension attached to said inner surface opposite said distal end; and, an inner seal attached to said extension and sized larger than the opening;

a guide positioned forward of said inner seal and attached to said distal end, said guide dimensioned to be inserted into the opening; and, at least one stop attached to said extender, when said stop disposed in the pipe, said stop movable with respect to the pipe in one direction and prevents misalignment of said cap with said pipe.

12. A device according to claim 11, wherein a first of said at least one stop is positioned adjacent said distal end.

13. A device according to claim 12, wherein a second of said at least one stop is positioned adjacent a bottom of said chamber.

14. A device according to claim 11, wherein said stop comprises at least two arms symmetrically disposed about said extender and angled away from said entry direction.

15. A device according to claim 11, further comprising a handle positioned on said cap.

16. A device according to claim 15, wherein said handle is adapted to be gripped robotically.

17. A device according to claim 15, wherein said extender passing through said cap provides said handle.

18. A plugging device for closing an opening defined by an end of a pipe with sealant, comprising:

a cap having an inner surface defining a chamber adapted for retaining the sealant, said chamber dimensioned slightly larger than said end to receive the end and define a gap therebetween;

an extension having a distal end and attached to said inner surface opposite said distal end, said cap and said extension defining a cap conduit for communicating material from within said pipe to outside said pipe; and, an inner seal attached to said extension and sized larger than the opening.

19. A device according to claim 18, further comprising a guide positioned forward of said inner seal and attached to said distal end, said guide dimensioned to be inserted into the opening.

20. A device according to claim 18, further comprising at least one stop attached to said extender, when said stop disposed in the pipe, said stop movable with respect to the pipe only an entry direction.

21. A device according to claim 20, wherein said at least one stop prevents misalignment of said cap with said pipe.

22. A device according to claim 21, wherein a first of said at least one stop is positioned adjacent said distal end.

23. A device according to claim 22, wherein a second of said at least one stop is positioned adjacent a bottom of said chamber.

24. A device according to claim 18, wherein said stop comprises at least two arms symmetrically disposed about said extender and angled away from said entry direction.

25. A device according to claim 18, further comprising a handle positioned on said cap.

26. A device according to claim 25, wherein said handle is adapted to be gripped robotically.

27. A device according to claim 25, wherein said extender passing through said cap provides said handle.

* * * * *